(12) United States Patent
Suzuki et al.

(10) Patent No.: US 11,218,654 B2
(45) Date of Patent: Jan. 4, 2022

(54) PHOTOELECTRIC CONVERSION DEVICE, IMAGING SYSTEM, AND MOVABLE BODY

(71) Applicant: CANON KABUSHIKI KAISHA, Tokyo (JP)

(72) Inventors: Takanori Suzuki, Tokyo (JP); Satoshi Kato, Kanagawa (JP); Keigo Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/210,656

(22) Filed: Mar. 24, 2021

(65) Prior Publication Data

US 2021/0306579 A1 Sep. 30, 2021

(30) Foreign Application Priority Data

Mar. 26, 2020 (JP) .............................. JP2020-055714

(51) Int. Cl.
*H04N 5/376* (2011.01)
*H04N 5/3745* (2011.01)
*H04N 9/04* (2006.01)
*H04N 5/357* (2011.01)
*H04N 5/378* (2011.01)

(52) U.S. Cl.
CPC ............. *H04N 5/357* (2013.01); *H04N 5/378* (2013.01); *H04N 5/3765* (2013.01); *H04N 5/37452* (2013.01); *H04N 9/0455* (2018.08); *H04N 5/37455* (2013.01)

(58) Field of Classification Search
None
See application file for complete search history.

(56) References Cited

U.S. PATENT DOCUMENTS

| | | | |
|---|---|---|---|
| 7,741,593 B2 | 6/2010 | Iwata et al. | |
| 7,817,199 B2 | 10/2010 | Yamashita et al. | |
| 8,084,729 B2 | 12/2011 | Kato et al. | |
| 8,154,639 B2 | 4/2012 | Kato et al. | |
| 8,159,582 B2 | 4/2012 | Kato et al. | |
| 8,309,898 B2 | 11/2012 | Kato et al. | |

(Continued)

FOREIGN PATENT DOCUMENTS

| | | |
|---|---|---|
| JP | 2003-198950 A | 7/2003 |
| JP | 2003-234963 A | 8/2003 |

(Continued)

OTHER PUBLICATIONS

U.S. Appl. No. 17/241,297, filed Apr. 27, 2021 (First Named Inventor: Kazuhiro Saito).

*Primary Examiner* — Mark T Monk
(74) *Attorney, Agent, or Firm* — Venable LLP

(57) ABSTRACT

A photoelectric conversion device comprising: a first signal transfer unit group having a plurality of signal transfer units which transfer digital signals to a first common output line from a first holding circuit group; and a second signal transfer unit group having a plurality of signal transfer units which transfer digital signals to a second common output line from a second holding circuit group, wherein each of the plurality of signal transfer units is capable of transiting to a second state in which current consumption is less than current consumption in a first state, and, in a predetermined period, a number of the signal transfer units in the second state increases in the first signal transfer unit group and a number of the signal transfer units in the second state decreases in the second signal transfer unit group.

18 Claims, 16 Drawing Sheets

(56) References Cited

U.S. PATENT DOCUMENTS

| | | |
|---|---|---|
| 8,675,107 B2 | 3/2014 | Yamashita et al. |
| 9,197,833 B2 | 11/2015 | Kato |
| 9,267,840 B2 | 2/2016 | Kato |
| 9,270,914 B2 | 2/2016 | Kato |
| 9,305,954 B2 | 4/2016 | Kato et al. |
| 9,813,681 B2 | 11/2017 | Kato |
| 9,966,395 B2 | 5/2018 | Kato et al. |
| 10,116,854 B2 | 10/2018 | Kato |
| 2004/0080647 A1 | 4/2004 | Inui et al. |
| 2010/0149394 A1 | 6/2010 | Yamazaki et al. |
| 2011/0242351 A1 | 10/2011 | Shoji |
| 2021/0021770 A1 | 1/2021 | Nakazawa et al. |
| 2021/0021782 A1 | 1/2021 | Sato et al. |

FOREIGN PATENT DOCUMENTS

| | | |
|---|---|---|
| JP | 2010-147684 A | 7/2010 |
| JP | 2011-211455 A | 10/2011 |

PHOTOELECTRIC CONVERSION DEVICE, IMAGING SYSTEM, AND MOVABLE BODY

BACKGROUND OF THE INVENTION

Field of the Invention

The present invention relates to a photoelectric conversion device, an imaging system, and a movable body.

Description of the Related Art

A photoelectric conversion device such as a CMOS image sensor including an analog/digital conversion function is used in image input equipment such as a digital camera.

Japanese Patent Application Publication No. 2010-147684 discloses, as a technique for outputting a digital signal (digital data) at high speed, a horizontal transfer technique for executing high-speed reading by reading the digital signal for each block.

Although the technique disclosed in Japanese Patent Application Publication No. 2010-147684 allows high-speed output of the digital signal, consideration is not given to power supply noise which occurs in power supply wiring. Consequently, in Japanese Patent Application Publication No. 2010-147684, when the number of means for signal transmission which do not operate is increased or decreased during horizontal transfer, current consumption changes with time. With this, the power supply noise occurs in a circuit block which shares the same power supply such as, e.g., a latch pulse generation circuit of a comparator, and the power supply noise appears in sensor output as a vertical streak.

SUMMARY OF THE INVENTION

To cope with this, an object of the present technique is to provide a photoelectric conversion device capable of reducing power supply noise.

An aspect of the disclosure of the present technique is: a photoelectric conversion device comprising: a plurality of pixels which are disposed in a plurality of columns; a plurality of holding circuits which are disposed so as to correspond to the columns in which the plurality of pixels are disposed and hold digital signals corresponding to outputs of the pixels; a first signal transfer unit group having a plurality of signal transfer units which transfer digital signals from a first holding circuit group which is part of the plurality of holding circuits and has two or more of the holding circuits; a second signal transfer unit group having a plurality of signal transfer units which transfer digital signals from a second holding circuit group which is another part of the plurality of holding circuits and has two or more of the holding circuits; and a plurality of common output lines which include a first common output line to which digital signals are transferred from the first signal transfer unit group and a second common output line to which digital signals are transferred from the second signal transfer unit group, wherein each of the plurality of signal transfer units is capable of transiting to a first state and a second state in which current consumption is less than current consumption in the first state, and, in a predetermined period, a number of the signal transfer units in the second state increases in the first signal transfer unit group and a number of the signal transfer units in the second state decreases in the second signal transfer unit group.

Further features of the present invention will become apparent from the following description of exemplary embodiments with reference to the attached drawings.

DESCRIPTION OF THE EMBODIMENTS

Hereinbelow, embodiments will be described by using the drawings. Note that the individual embodiments shown below can be arbitrarily combined as long as a contradiction does not occur. In addition, in the individual embodiments described below, an imaging device will be mainly described as an example of a photoelectric conversion device. However, each embodiment is not limited to the imaging device, and can also be applied to other examples of the photoelectric conversion device. Examples of the photoelectric conversion device include a distance measuring device (a device for distance measurement which uses focus detection or a time of flight (TOF)), and a photometric device (a device for measurement of the amount of incident light).

Figure 1:
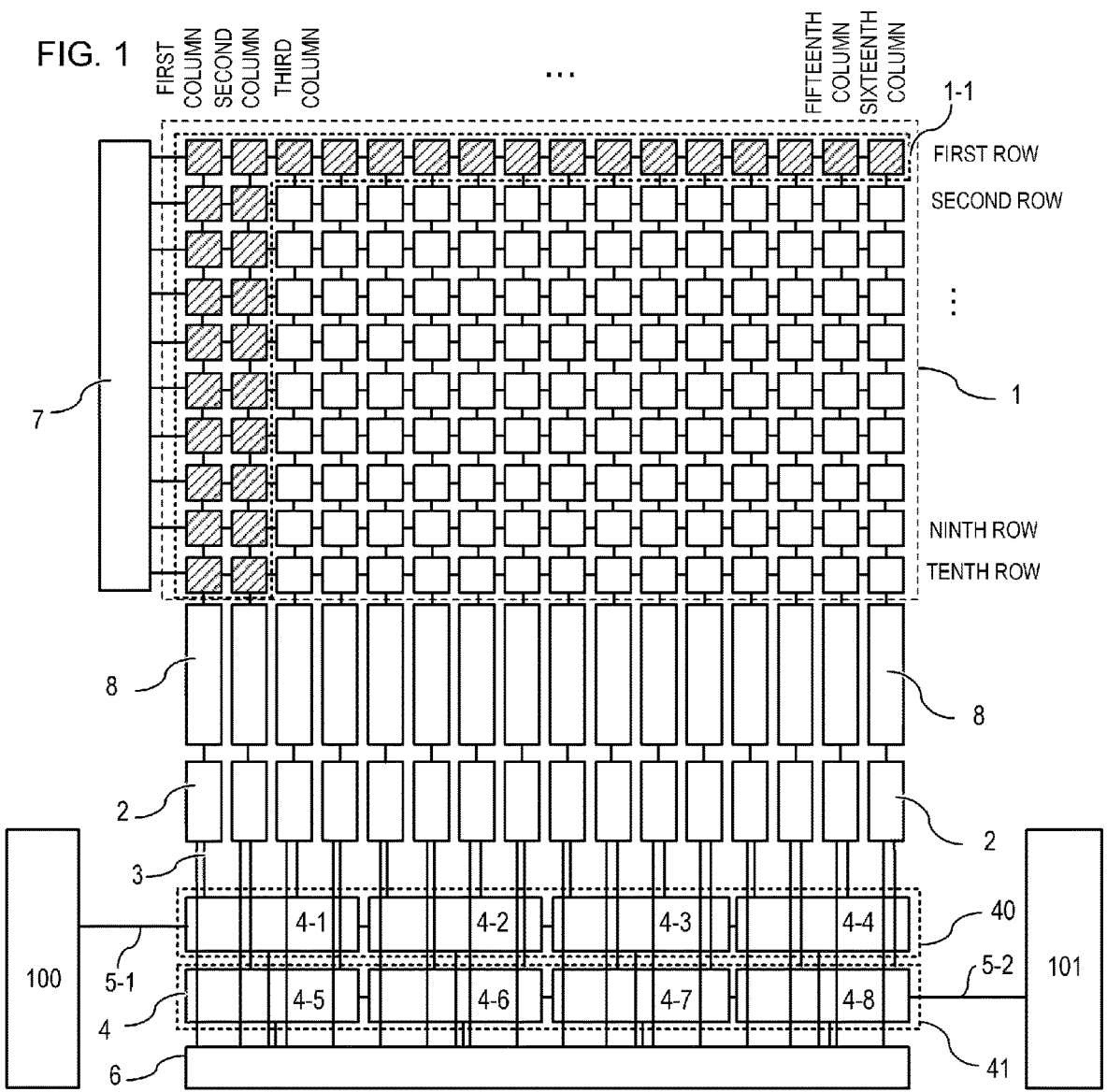
FIG. 1 is a circuit diagram of a photoelectric conversion device according to Embodiment 1.

<Embodiment 1>: (With regard to circuit configuration of photoelectric conversion device): A photoelectric conversion device according to Embodiment 1 will be described with reference to FIG. 1. FIG. 1 is a view showing an example of a circuit configuration of the photoelectric conversion device. The photoelectric conversion device has a pixel unit 1, a holding circuit 2, a digital output line 3, a signal transfer unit 4, a common output line 5, a horizontal scan circuit 6, a vertical scan circuit 7, an analog/digital converter 8, and signal processing circuits 100 and 101. In the present embodiment, the photoelectric conversion device has a plurality of the holding circuits 2, a plurality of the digital output lines 3, a plurality of the signal transfer units 4, a plurality of the common output lines 5, and a plurality of the analog/digital converters 8.

The pixel unit 1 has a plurality of pixels including photoelectric conversion elements. In the pixel unit 1, a plurality of pixels are arranged in a matrix (a two-dimensional shape, a plurality of columns). In the present embodiment, for the sake of simplicity, the matrix is shown as a matrix of pixels with ten rows and sixteen columns. Herein, one row (the first row) at an upper end of the pixel unit 1 and two columns (the first and second columns) at a left end of the pixel unit 1 correspond to an OB (optical black) pixel area 1-1. Each OB pixel (light-shielded pixel) of the OB pixel area 1-1 has a light-shielded photoelectric conversion element. Each of other pixels in nine rows and fourteen columns is an effective pixel having a photoelectric conversion element which is not light-shielded.

Correspondingly to each column of the pixel unit 1, the analog/digital converter 8 and the holding circuit 2 are disposed in each column. That is, in the present embodiment, the analog/digital converters 8 in sixteen columns and the holding circuits 2 in sixteen columns are disposed.

The analog/digital converter 8 performs analog/digital conversion on a pixel signal read from the pixel of the pixel unit 1 (converts an analog signal to a digital signal).

The holding circuit 2 holds a digital signal (digital data) having been subjected to the analog/digital conversion by the analog/digital converter 8. The holding circuit 2 can hold two types of signals including a reference signal N (N signal; reset signal) of the pixel signal and an effective signal S (S signal; photoelectric conversion signal) thereof as the digital signal corresponding to an output of the pixel. Herein, the reference signal N is the pixel signal in a reset state of the pixel. The effective signal S is the pixel signal (image signal) in a non-reset state of the pixel. In case where the holding circuit 2 holds the two types of signals, the signal processing circuits 100 and 101 in the subsequent stage perform differential processing (differential processing of S−N) of the two types of signals. The reference signal N and the effective signal S are transferred on a per pixel column basis (on a per holding circuit 2 basis) to the same common output line 5 (the same direction). That is, the reference signal N and the effective signal S held by one holding circuit 2 are output to the same signal processing circuit (the same common output line) via the common output line 5. Accordingly, the differential processing of S−N in the signal processing circuits 100 and 101 is facilitated.

By control of the horizontal scan circuit 6, digital signals held (stored) in the holding circuits 2 are sequentially read into the digital output lines 3 on a per column basis.

The digital signals read into the digital output lines 3 are transferred to a plurality of the common output lines 5 (5-1 and 5-2) via a plurality of the signal transfer units 4 (4-1 to 4-8). The digital signals transferred to the plurality of the common output lines 5 are output to the signal processing circuits 100 and 101. The signal processing circuits 100 and 101 perform various corrections such as the above-described differential processing of S−N, and compression of data on the digital signal.

Note that a series of operations related to reading of the pixel signals from the pixels are performed while the vertical scan circuit 7 selects the pixel row of the pixel unit 1. Note that, in FIG. 1, a circuit for controlling a pulse required for each circuit and the timing of the pulse is omitted.

In addition, in Embodiment 1, the analog/digital converter 8 is provided in each column so as to correspond to each column of the pixel unit 1, but a configuration may also be adopted in which the analog/digital conversion is performed in the pixel unit 1.

Figure 2:
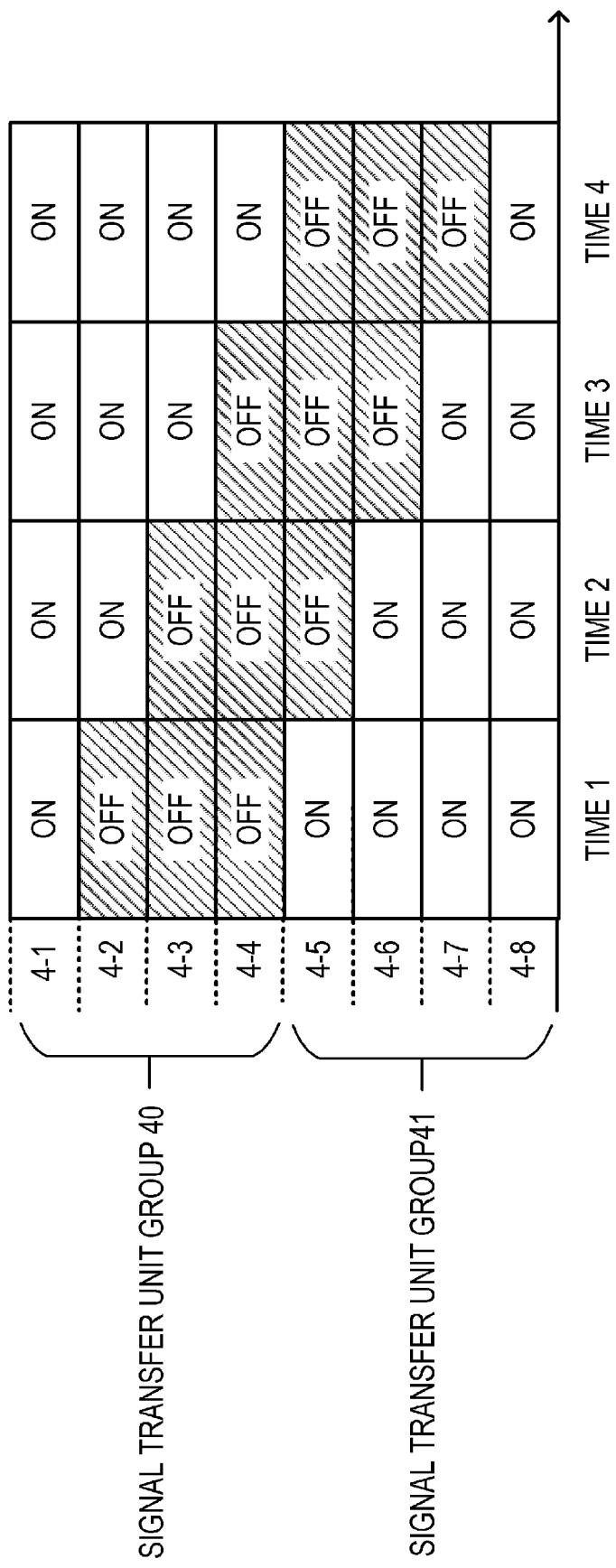
FIG. 2 is a view showing ON/OFF of a signal transfer unit according to Embodiment 1.

(With regard to current consumption of signal transfer unit): Temporal change of current consumption in the signal transfer unit 4 according to the present embodiment will be described with reference to FIG. 2. FIG. 2 is a view showing the current consumption of a plurality of the signal transfer units 4 for each time.

In the present embodiment, as shown in FIG. 1, eight signal transfer units 4 are provided in the photoelectric conversion device. Four signal transfer units 4-1 to 4-4 form a signal transfer unit group 40, and are connected to the common output line 5-1. Four signal transfer units 4-5 to 4-8 form a signal transfer unit group 41, and are connected to the common output line 5-2. The common output line 5-2 is disposed on the right side (a direction in which a horizontal scan is performed) of the signal transfer unit group 41, and the common output line 5-1 is disposed on the left side of the signal transfer unit group 40. That is, the signal transfer unit group 40 and the signal transfer unit group 41 perform horizontal transfer in mutually different directions (mutually opposite directions) (output signals to signal processing circuits which are present in mutually different directions). In addition, to the signal transfer unit groups 40 and 41, digital signals are transferred from two or more holding circuits 2 (holding circuit group) which are different from each other. That is, digital signals are transferred to the signal transfer unit group 40 from part of the eight holding circuits 2, and digital signals are transferred to the signal transfer unit group 41 from another part of the eight holding circuits 2.

In FIG. 2, a state in which the digital signal is transferred in the signal transfer unit 4 is indicated by "ON". A state in which the digital signal is not transferred in the signal transfer unit 4 and current consumption is less than that in the state of "ON" (a state in which current consumption is suppressed) is indicated by "OFF".

At time 1, the signal transfer unit 4-1 of the signal transfer unit group 40 and the signal transfer units 4-5 to 4-8 of the signal transfer unit group 41 are in the ON state. The signal transfer units 4-2 to 4-4 of the signal transfer unit group 40 are in the OFF state.

At time 2, the signal transfer units 4-1 and 4-2 of the signal transfer unit group 40 and the signal transfer units 4-6 to 4-8 of the signal transfer unit group 41 are in the ON state. The signal transfer units 4-3 and 4-4 of the signal transfer unit group 40 and the signal transfer unit 4-5 of the signal transfer unit group 41 are in the OFF state.

At time 3, the signal transfer units 4-1 to 4-3 of the signal transfer unit group 40 and the signal transfer units 4-7 and 4-8 of the signal transfer unit group 41 are in the ON state. The signal transfer unit 4-4 of the signal transfer unit group 40 and the signal transfer units 4-5 and 4-6 of the signal transfer unit group 41 are in the OFF state.

At time 4, the signal transfer units 4-1 to 4-4 of the signal transfer unit group 40 and the signal transfer unit 4-8 of the signal transfer unit group 41 are in the ON state. The signal transfer units 4-5 to 4-7 of the signal transfer unit group 41 are in the OFF state.

Thus, the photoelectric conversion device according to the present embodiment has the signal transfer unit group 40 in which the number of signal transfer units 4 in the OFF state decreases as time elapses in a predetermined period, and the signal transfer unit group 41 in which the number of signal transfer units 4 in the OFF state increases as time elapses in a predetermined period. Accordingly, in all of the signal transfer units 4 included in the signal transfer unit group 40 and the signal transfer unit group 41, the number of signal transfer units 4 in the ON state and the number of signal transfer units 4 in the OFF state at each time are "ON: five, OFF: three", and, even when the time changes, the number of signal transfer units 4 in the ON state and the number of signal transfer units 4 in the OFF state do not change and are constant. Consequently, according to the present embodiment, current consumption is smoothed, and hence it is possible to reduce power supply noise.

(With regard to circuit configuration of signal transfer unit): Examples of a circuit configuration of the signal transfer unit 4 according to the present embodiment will be described with reference to FIGS. 3 to 6. FIGS. 3 to 6 are views showing a plurality of examples of an equivalent circuit of the signal transfer unit 4.

Figure 3:
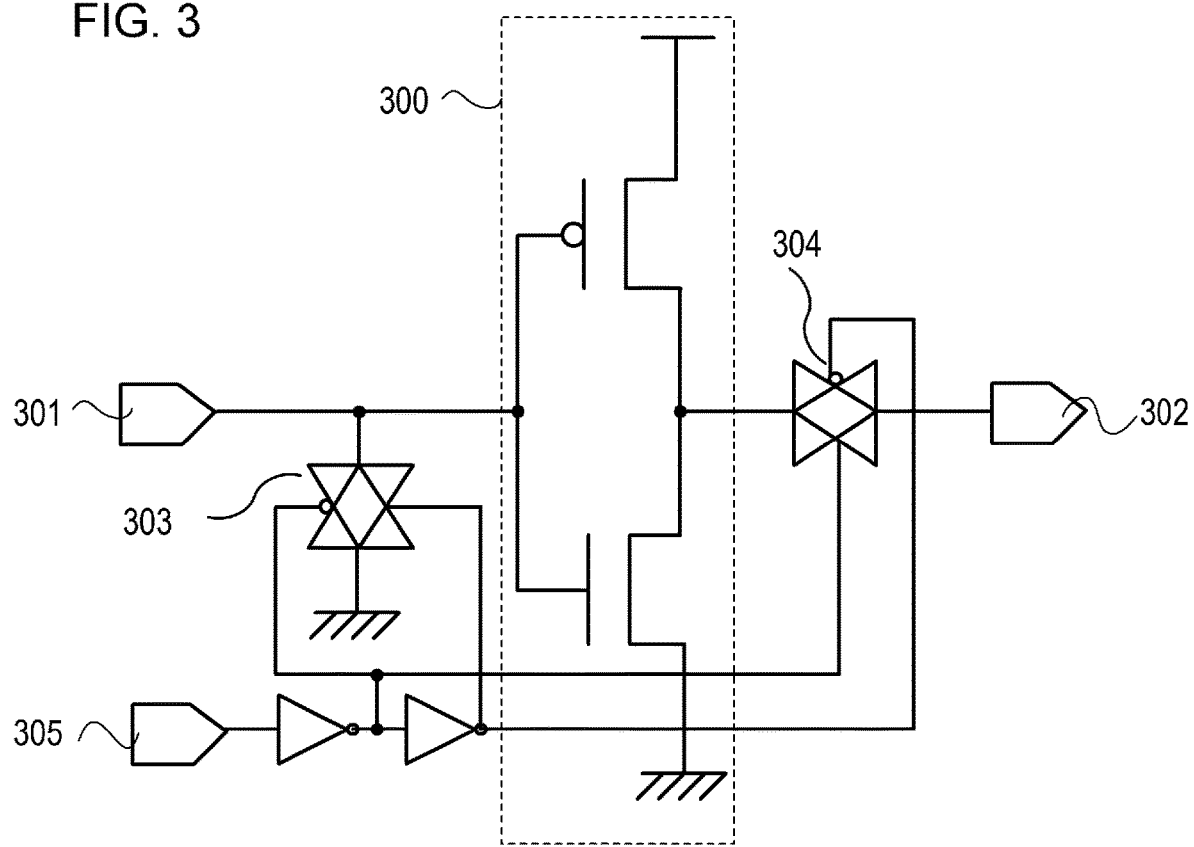
FIG. 3 is an example of a circuit diagram of the signal transfer unit according to Embodiment 1.

(Example 1): In FIG. 3, the signal transfer unit 4 has a CMOS inverter circuit, and a switch serving as a current consumption suppression unit. In the example in FIG. 3, the signal transfer unit 4 has a CMOS inverter circuit 300, an input terminal 301, an output terminal 302, a switch 303, a switch 304, and a suppression terminal 305. In case where the digital signal is not transferred, the switch 303 fixes the input terminal 301 to a fixed potential (reference potential). In case where the digital signal is not transferred, the switch 304 electrically separates the signal transfer unit 4 having the switch 304 from the subsequent signal transfer unit 4. That is, with such operations performed by the switches 303 and 304, current consumption of the signal transfer unit 4 is suppressed. The suppression terminal 305 controls the switches 303 and 304 by outputting pulses to the switches 303 and 304.

Figure 4:
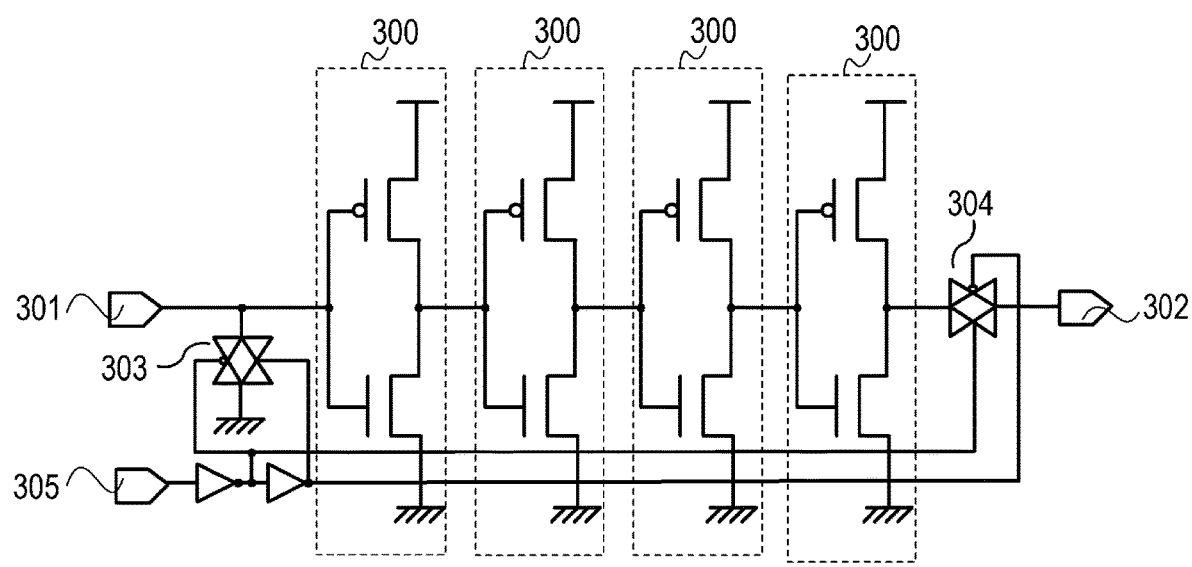
FIG. 4 is an example of the circuit diagram of the signal transfer unit according to Embodiment 1.

Note that, in FIG. 3, the circuit configuration in which one CMOS inverter circuit is provided is described as the example, but a configuration may also be adopted in which a plurality of the CMOS inverter circuits 300 are connected in series, and driving force is increased stepwise, as shown in FIG. 4. It is possible to configure a normal buffer circuit by connecting an even number of the CMOS inverter circuits 300 in series and it is possible to configure an inverted buffer circuit by connecting an odd number of the CMOS inverter circuits 300 in series, and either configuration may be used.

Figure 5:
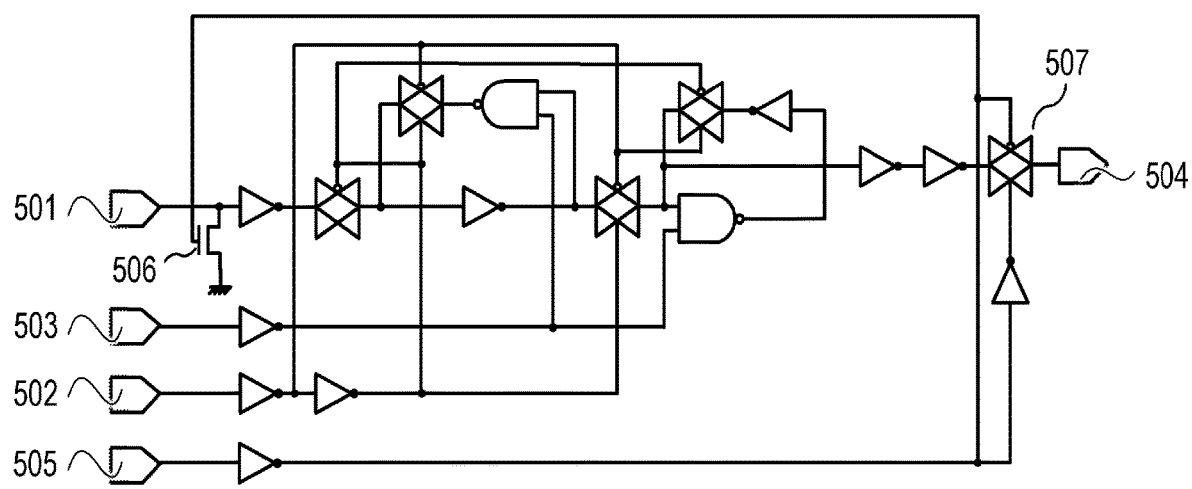
FIG. 5 is an example of the circuit diagram of the signal transfer unit according to Embodiment 1.

(Example 2): FIG. 5 shows a synchronization delay circuit (flip-flop circuit) which is one of other configuration examples of the signal transfer unit 4. In the example in FIG. 5, the signal transfer unit 4 has an input terminal 501, a clock terminal 502, a reset input terminal 503, an output terminal 504, a suppression terminal 505, a switch 506, and a switch 507.

In such a synchronization delay circuit, it is possible to reproduce the waveform of the digital signal by connecting the digital output line 3 to the input terminal 501 and synchronizing the digital signal input from the holding circuit 2 to a clock which is input to the clock terminal 502. Consequently, even when the digital signal from the digital output line 3 is delayed, it is possible to reproduce the waveform of the digital signal, and hence it is possible to implement high-speed reading of the digital signal in the photoelectric conversion device.

In case where the digital signal is not transferred, the switch 506 fixes the input terminal 501 to a fixed potential. In case where the digital signal is not transferred, the switch 507 electrically separates the signal transfer unit 4 having the switch 507 from the subsequent signal transfer unit 4. That is, similarly to Example 1, also in the present example, with such operations of the switches 506 and 507, the current consumption of the signal transfer unit 4 is suppressed.

Thus, in FIG. 5, the current consumption is suppressed by fixing the input terminal 501 to the fixed potential and electrically separating the signal transfer unit 4 from the subsequent signal transfer unit 4. However, the current consumption of the signal transfer unit 4 may also be suppressed by stopping input of the reset signal to the reset input terminal 503 or stopping input of the clock (reference clock) to the clock terminal 502.

Figure 6:
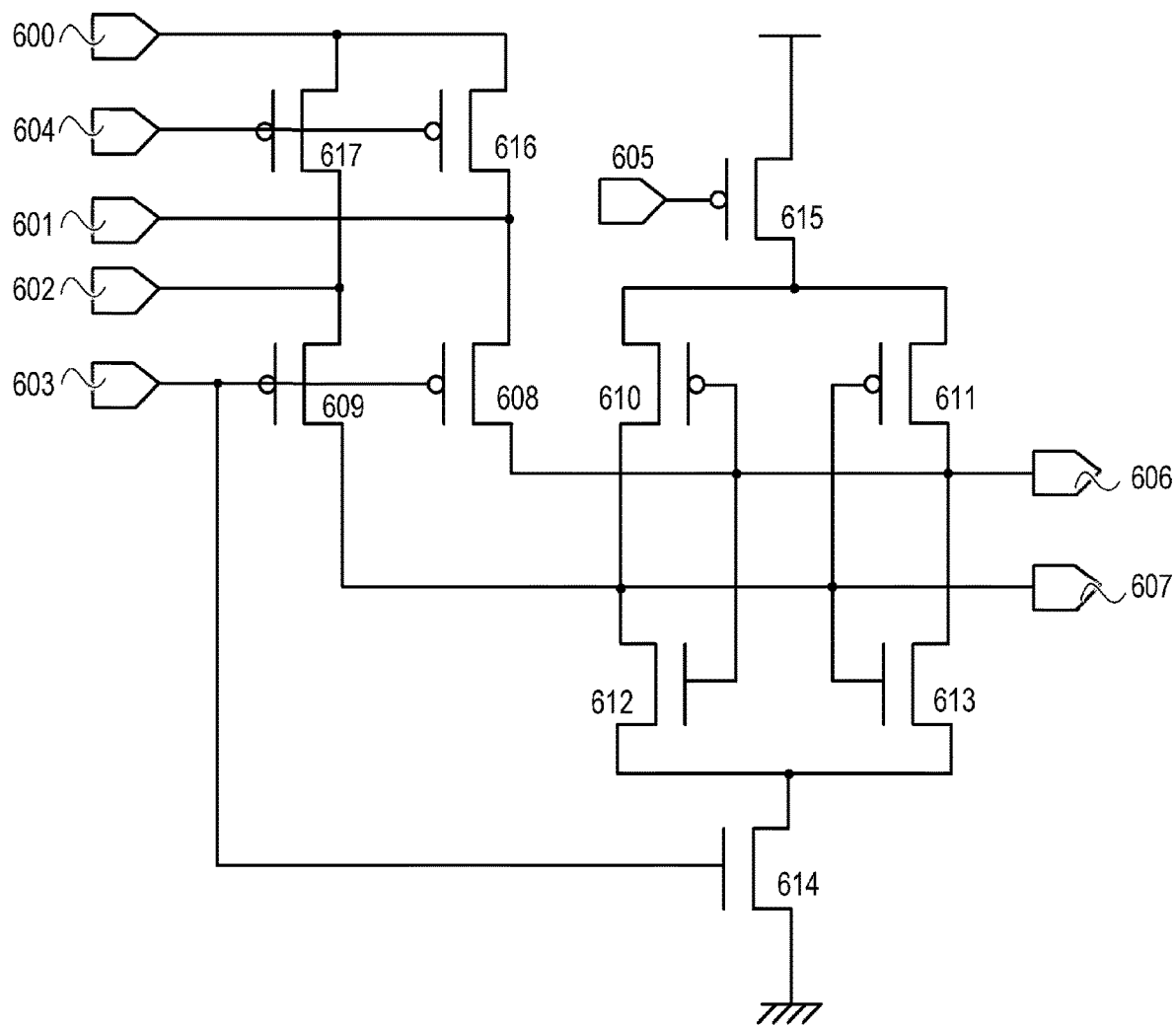
FIG. 6 is an example of the circuit diagram of the signal transfer unit according to Embodiment 1.
Figure 7:
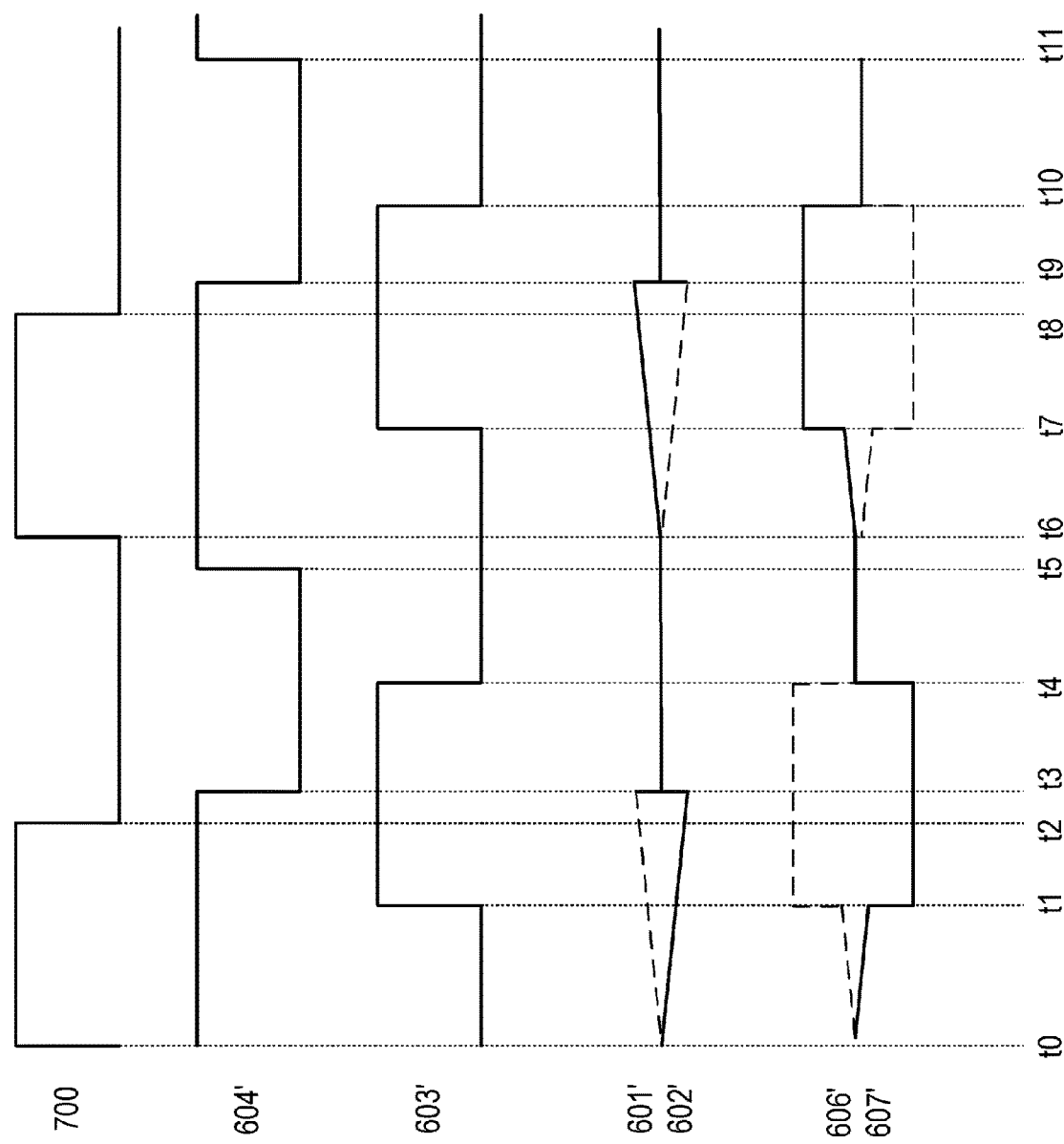
FIG. 7 is a view showing signals in the signal transfer unit shown in FIG. 6.

(Example 3): FIG. 6 shows a comparison circuit (sense amplifier circuit) which is one of other configuration examples of the signal transfer unit 4. FIG. 7 is a view showing the drive timing of the comparison circuit shown in FIG. 6.

In case where the signal transfer unit 4 shown in FIG. 6 is applied to the photoelectric conversion device shown in FIG. 1, the holding circuit 2 outputs a differential signal including a normal signal and an inverted signal (a signal having a phase opposite to that of the normal signal) (performs differential output). Consequently, two digital output lines 3 are connected to one holding circuit 2.

The signal transfer unit 4 shown in FIG. 6 has a reset input terminal 600 to which a reset voltage is input, differential input terminals 601 and 602, differential output terminals 606 and 607, a latch pulse input terminal 603, a reset pulse input terminal 604, and an inverted latch pulse input terminal 605. In addition, the signal transfer unit 4 has PMOS transistors 608 to 611 and 615 to 617, and NMOS transistors 612 to 614. To the differential input terminal 601, a normal signal is input from the holding circuit 2. To the differential input terminal 602, an inverted signal is input from the holding circuit 2. In addition, to the inverted latch pulse input terminal 605, an inverted signal of a pulse given to the latch pulse input terminal 603 is given.

The detailed operation of the signal transfer unit 4 shown in FIG. 6 will be described by using a timing chart in FIG. 7. An enable pulse 700 in FIG. 7 is a signal which enables the output of the holding circuit 2. A logical product of the enable pulse 700 and a signal of a column selected by the horizontal scan circuit 6 serves as the output timing of the holding circuit 2. In FIG. 7, from time t0 to time t2, the enable pulse 700 is at a high level and the output of the holding circuit 2 is enabled.

From time t0 to time t2, a normal signal 601' input to the differential input terminal 601 and an inverted signal 602' input to the differential input terminal 602 change according to the digital signal which is temporarily held in the holding circuit 2. Specifically, when the digital signal temporarily held in the holding circuit 2 is 1 (high level), the normal signal 601' transitions to the high level, and the inverted signal 602' transitions to a low level. However, the driving force of the holding circuit 2 serving as an output circuit is low, and hence the normal signal 601' and the inverted signal 602' are delayed, and the amount of change per unit time is small.

Until time t1, a latch signal 603' which is input to the latch pulse input terminal 603 is in a low level state, the PMOS transistors 608 and 609 are in an ON state, and the NMOS transistor 614 and the PMOS transistor 615 are in an OFF state. Consequently, from time t0 to time t1, a normal signal 606' output by the differential output terminal 606 and an inverted signal 607' output by the differential output terminal 606 are at the same level as those of the normal signal 601' and the inverted signal 602'.

Subsequently, at time t1, the latch signal 603' transitions to the high level, and the NMOS transistor 614 and the PMOS transistor 615 are brought into the ON state. At this point, a latch circuit including four MOS transistors 610, 611, 612, and 613 is enabled. Accordingly, out of the normal signal 606' and the inverted signal 607', the normal signal 606' having a large value at time t1 changes to the high level, and the inverted signal 607' having a small value at time t1 changes to the low level.

A period between time t3 and time t5 is a reset period, and a reset pulse 604' input to the reset pulse input terminal 604 is at the low level. In this period, reading from the holding circuit 2 is not performed, and the normal signals 601' and 602', the normal signal 606', and the inverted signal 607' change to a reset level (are initialized). Note that, at a time point when the latch signal 603' changes to the low level, the normal signal 606' and the inverted signal 607' change to the reset level.

As an operation at and after time t6, the operation from time t0 to time t5 is repeated. Note that, from time t6 to time t10, the holding circuit 2 outputs data of 0 (low level). Consequently, as compared with the operation from time t0 to time t5, a vertical relationship between the normal signal 601' and the inverted signal 602' which are inputs to the signal transfer unit 4 is inverted, and the results of the normal signal 606' and the inverted signal 607' which are output results of the signal transfer unit 4 are also inverted.

Thus, according to the sense amplifier circuit shown in FIG. 6, even at a stage in the process of transition of the signal level of each of the normal signal 601 and the inverted signal 602, when the latch circuit is enabled, it is possible to determine the digital signal to be output by comparing the two signals. Consequently, it is not necessary to move the differential input terminals 601 and 602 to a portion between a ground and a power supply, and it is possible to perform reading at high speed and at low current consumption.

In addition, according to the present circuit configuration, according to a timing when the latch signal 603 changes to the high level, it is determined whether each of the normal signal 606' and the inverted signal 607 is at the high level or the low level (the digital signal to be transferred is determined). Accordingly, similarly to the flip-flop circuit in FIG. 5, the effect of synchronizing the signal to the clock is also achieved. Note that, in case where the transfer of the digital signal is not performed, the current consumption is suppressed by fixing the latch signal 603 to the low level (or fixing the reset pulse to the low level).

Figure 8:
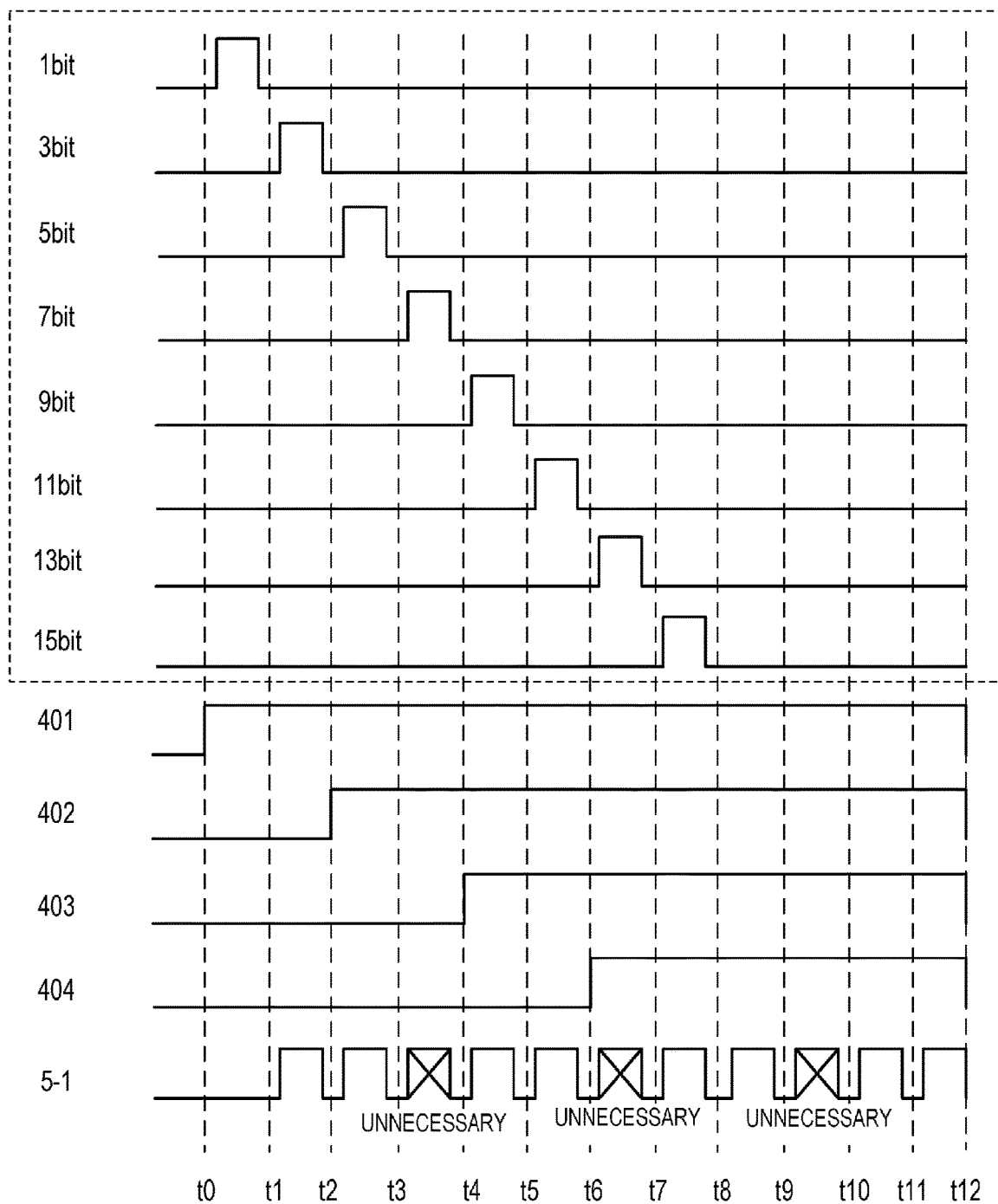
FIG. 8 is a view showing a relationship between a signal transfer unit group and a horizontal scan circuit according to Embodiment 1.
Figure 9:
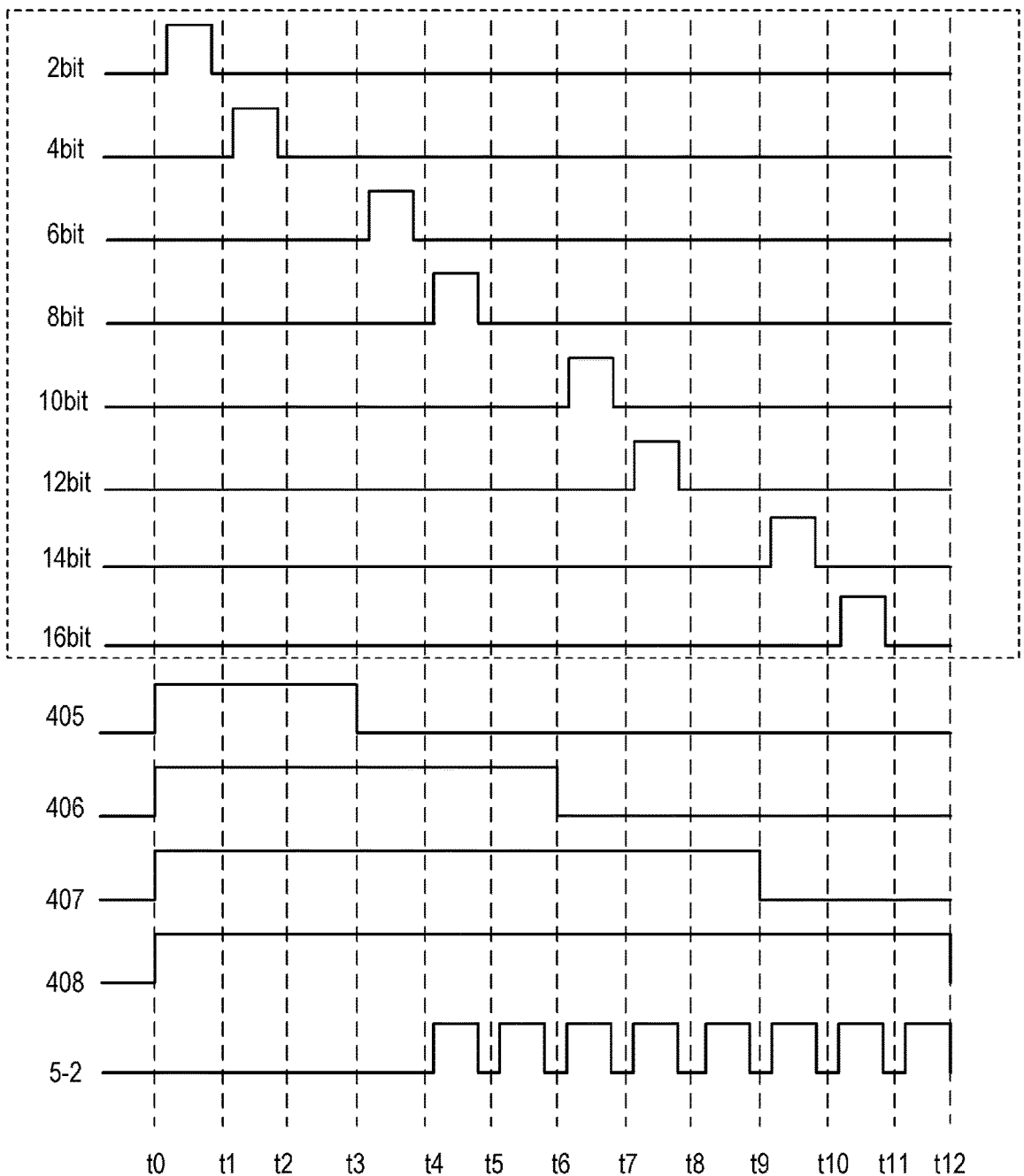
FIG. 9 is a view showing the relationship between the signal transfer unit group and the horizontal scan circuit according to Embodiment 1.

(With regard to horizontal transfer operation): A horizontal transfer operation by the signal transfer unit 4 and the horizontal scan circuit 6 will be described with reference to FIGS. 8 and 9. Each of FIGS. 8 and 9 is a timing chart showing the horizontal transfer operation by the signal transfer unit 4 and the horizontal scan circuit 6.

(Horizontal transfer operation of signal transfer unit group 40 and horizontal scan circuit 6): First, a relationship between the signal transfer unit group 40 and the horizontal scan circuit 6 in the horizontal transfer operation will be described by using FIG. 8. Herein, as shown in FIG. 1, each of the holding circuits 2 arranged in sixteen columns and the horizontal scan circuit 6 are connected via the signal line, and an output signal is thereby input to each of sixteen holding circuits 2 from the horizontal scan circuit 6. In the following description, a signal which is to be input to the holding circuit 2 in the n-th column (n is a natural number which is any of 1 to 16) and is output from the horizontal scan circuit 6 is described as "the n-th bit" of the output signal. Note that, in the present embodiment, a horizontal scan is performed from the pixel in the first column toward the pixel in the sixteenth column.

From time t0 to time t1, the first bit of the output signal of the horizontal scan circuit 6 is at a high level, and the third bit of the output signal is at the high level from time t1 to time t2. At this point, the reading of the holding circuit 2 in an odd-numbered column corresponding to the output signal at the high level is enabled. That is, the reading of the holding circuit 2 in the first column is enabled when the first bit of the output signal of the horizontal scan circuit 6 transitions to the high level, and the reading of the holding circuit 2 in the third column is enabled when the third bit of the output signal transitions to the high level. This applies to a period from time t2 to time t3 and a period subsequent thereto.

In addition, in the present embodiment, the signal transfer unit 4 operates (transfer ON) when a current consumption suppression pulse input to the signal transfer unit 4 is at the high level, and the current consumption of the signal transfer unit 4 is suppressed (transfer OFF) when the current consumption suppression pulse is at a low level. That is, according to the current consumption suppression pulse, the signal transfer unit 4 can transition to an operation state or a current suppression state. In case where the signal transfer unit 4 has such a circuit configuration, the current consumption suppression pulse and temporal change satisfy the following relationship.

A current consumption suppression pulse 401 input to the signal transfer unit 4-1 is at the high level from time t0 to time t12. A current consumption suppression pulse 402 input to the signal transfer unit 4-2 is at the high level from time t2 to time t12. A current consumption suppression pulse 403 input to the signal transfer unit 4-3 is at the high level from time t4 to time t12. A current consumption suppression pulse 404 input to the signal transfer unit 4-4 is at the high level from time t6 to time t12.

That is, from time t0 to time t12, the number of operating signal transfer units 4 increases in the signal transfer unit group 40. In other words, the number of signal transfer units 4 of which the current consumption is suppressed decreases.

The result of the reading of the digital signal of the holding circuit 2 in the first column which is enabled from time t0 to time t1 is output via the signal transfer unit 4-1, as shown in FIG. 1. With this, the result of the reading of the digital signal of the holding circuit 2 in the first column is output to the common output line 5-1 at a timing delayed by one clock relative to a clock supplied from the horizontal scan circuit 6. Similarly, the digital signal of the holding circuit 2 in the third column is output to the common output line 5-1 at a timing delayed by one clock.

In contrast to this, the digital signals of the holding circuits 2 in the fifth column and the seventh column are output to the common output line 5-1 via two signal transfer units 4-1 and 4-2. Accordingly, the result of the reading of the digital signal of the holding circuit 2 in the fifth column which is enabled from time t2 to time t3 is output to the common output line 5-1 from time t4 to time t5 at a timing delayed by two clocks relative to the clock supplied from the horizontal scan circuit 6.

Thus, the digital signal of the holding circuit 2 in the third column is output to the common output line 5-1 from time t2 to time t3, and the digital signal of the holding circuit 2 in the fifth column is output to the common output line 5-1 from time t4 to time t5. Consequently, the digital signal output to the common output line 5-1 from time t3 to time t4 is unnecessary data which is not the digital signal from the holding circuit 2 in one of the columns. Note that, by considering a difference in delay amount caused by each configuration, it is possible to prevent the unnecessary data which reaches the signal processing circuit 100 from occurring. Specifically, the third bit and the fifth bit of the output signal of the horizontal scan circuit 6 are caused to transition to the high level at the same time, or the digital signal is caused to pass through a delay circuit which is not shown after being output to the common output line 5-1. With this, it is possible to input the digital signals of the holding circuits 2 to the signal processing circuit 100 in an order in which the columns are arranged sequentially.

(Horizontal transfer operation of signal transfer unit group 41 and horizontal scan circuit 6): Next, a relationship between the signal transfer unit group 41 and the horizontal scan circuit 6 in the horizontal transfer operation will be described by using FIG. 9.

The second bit of the output signal of the horizontal scan circuit 6 is at the high level from time t0 to time t1, and the fourth bit thereof is at the high level from time t1 to time t2. As a result, the reading of the holding circuit 2 in the corresponding even-numbered column is enabled. Similarly, in a period from time t2 to time t3 and a period subsequent thereto, the reading of the holding circuit 2 in the column corresponding to the bit of the horizontal scan circuit 6 at the high level is enabled.

Herein, similarly to the foregoing, it is assumed that the signal transfer unit 4 operates when the current consumption suppression pulse to be input is at the high level (transfer ON), and the current consumption of the signal transfer unit 4 is suppressed when the current consumption suppression pulse is at the low level (transfer OFF). In case where the signal transfer unit 4 has such a circuit configuration, the current consumption suppression pulse and temporal change satisfy the following relationship.

A current consumption suppression pulse 405 input to the signal transfer unit 4-5 is at the high level from time t0 to time t3. A current consumption suppression pulse 406 input to the signal transfer unit 4-6 is at the high level from time t0 to time t6. A current consumption suppression pulse 407 input to the signal transfer unit 4-7 is at the high level from time t0 to time t9. A current consumption suppression pulse 408 input to the signal transfer unit 4-8 is at the high level from time t0 to time t12.

That is, from time t0 to time t12, the number of operating signal transfer units 4 decreases in the signal transfer unit group 41. In other words, the number of signal transfer units 4 of which the current consumption is suppressed increases.

The result of the reading of the digital signal of the holding circuit 2 in the second column which is enabled from time t0 to time t1 is output via four signal transfer units 4-5, 4-6, 4-7, and 4-8. With this, the digital signal thereof is output to the common output line 5-2 from time t4 to time t5 at a timing delayed by four clocks relative to the clock supplied from the horizontal scan circuit 6. Similarly, the digital signal of the holding circuit 2 in the fourth column is output to the common output line 5-2 from time t5 to time t6 at a timing delayed by four clocks.

In contrast to this, the digital signals of the holding circuits 2 in the sixth column and the eighth column are output to the common output line 5-2 via three signal transfer units 4-6, 4-7, and 4-8. Herein, if the reading of the holding circuit 2 in the sixth column is enabled from time t2 to time t3, the digital signal of the corresponding holding circuit 2 is output to the common output line 5-2 from time t5 to time t6 at a timing delayed by three clocks relative to the clock supplied from the horizontal scan circuit 6. That is, the digital signals of the holding circuits 2 in the fourth column and the sixth column are output to the common output line 5-2 at the same timing from time t5 to time t6. To cope with this, in the present embodiment, in consideration of a difference in delay amount, after a lapse of two clocks after the fourth bit of the output signal of the horizontal scan circuit 6 is caused to transition to the high level, the sixth bit thereof is caused to transition to the high level. With this, it is possible to input the digital signals (pixel signals) acquired from the pixels to the signal processing circuit 101 in the order in which the columns are arranged sequentially.

It is also possible to cause timings when the digital signals reach the signal processing circuits 100 and 101 to match each other also by causing the digital signals to pass through a delay circuit which is not shown after being output to the common output line 5-2.

Thus, in the present embodiment, the photoelectric conversion device has the signal transfer unit group 40 in which the number of signal transfer units 4 of which the current consumption is suppressed decreases, and the signal transfer unit group 41 in which the number of signal transfer units 4 of which the current consumption is suppressed increases. Consequently, the current consumption in the horizontal transfer operation is smoothed, and it is possible to reduce the power supply noise.

Figure 10:
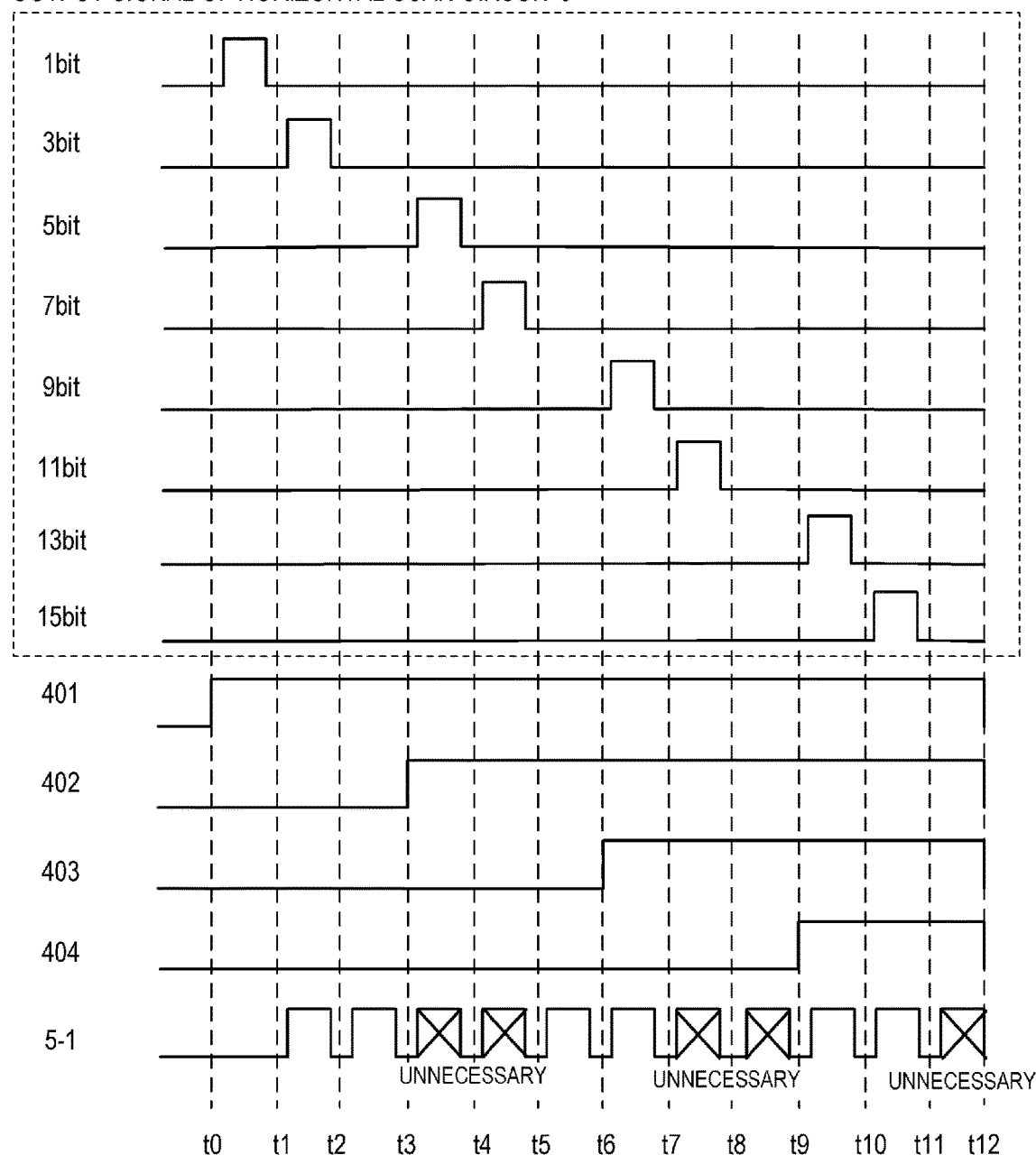
FIG. 10 is a view showing the relationship between the signal transfer unit group and the horizontal scan circuit according to Embodiment 1.

Note that the relationship between the signal transfer unit group 40 and the horizontal scan circuit 6 in the horizontal transfer operation may also be the relationship shown in FIG. 10. That is, after a lapse of two clocks after the third bit of the output signal of the horizontal scan circuit 6 transitions to the high level, the fifth bit thereof transitions to the high level. Similarly, after a lapse of two clocks after the seventh bit of the output signal of the horizontal scan circuit 6 transitions to the high level, the ninth bit thereof transitions to the high level. Thus, by controlling the output signal of the horizontal scan circuit 6, in the relationship with the signal transfer unit group 40 shown in FIG. 9, it is possible to make the number of signal transfer units 4 of which the current consumption is suppressed constant irrespective of a lapse of time in the entire photoelectric conversion device. Note that the ratio of appearance of the unnecessary data is higher than that in the case shown in FIG. 8, and hence, in order to output the digital signals to the common output line 5-1 sequentially, the digital signal may be caused to pass through a delay circuit which is not shown after being output to the common output line 5-1.

In addition, in generation of an image, as in the present embodiment, it is important to output the signals in an order in which pixels (the columns of the holding circuits 2) are arranged particularly in an imaging device. This is because reading in the order in which pixels are arranged is important when correction using an OB pixel or signal processing other than the correction is performed. In the present embodiment, the output of the holding circuit 2 is controlled by the horizontal scan circuit 6 such that the signals are transferred to the common output line 5-1 in an order of the holding circuit 2 in the first column, the holding circuit 2 in the third column, the holding circuit 2 in the fifth column, and the holding circuit 2 in the seventh column which hold the signals transferred to the common output line 5-1. Similarly, the output of the holding circuit 2 is controlled such that the signals are transferred to the common output line 5-2 in an order of the holding circuit 2 in the second column, the holding circuit 2 in the fourth column, the holding circuit 2 in the sixth column, and the holding circuit 2 in the eighth column which hold the signals transferred to the common output line 5-2. Consequently, it is possible to read data of each column in an order in which the data is arranged sequentially while smoothing the current consumption and reducing the power supply noise. Accordingly, it is possible to achieve an effect which is effective particularly in the technical field of the photoelectric conversion device according to the present embodiment.

Figure 11:
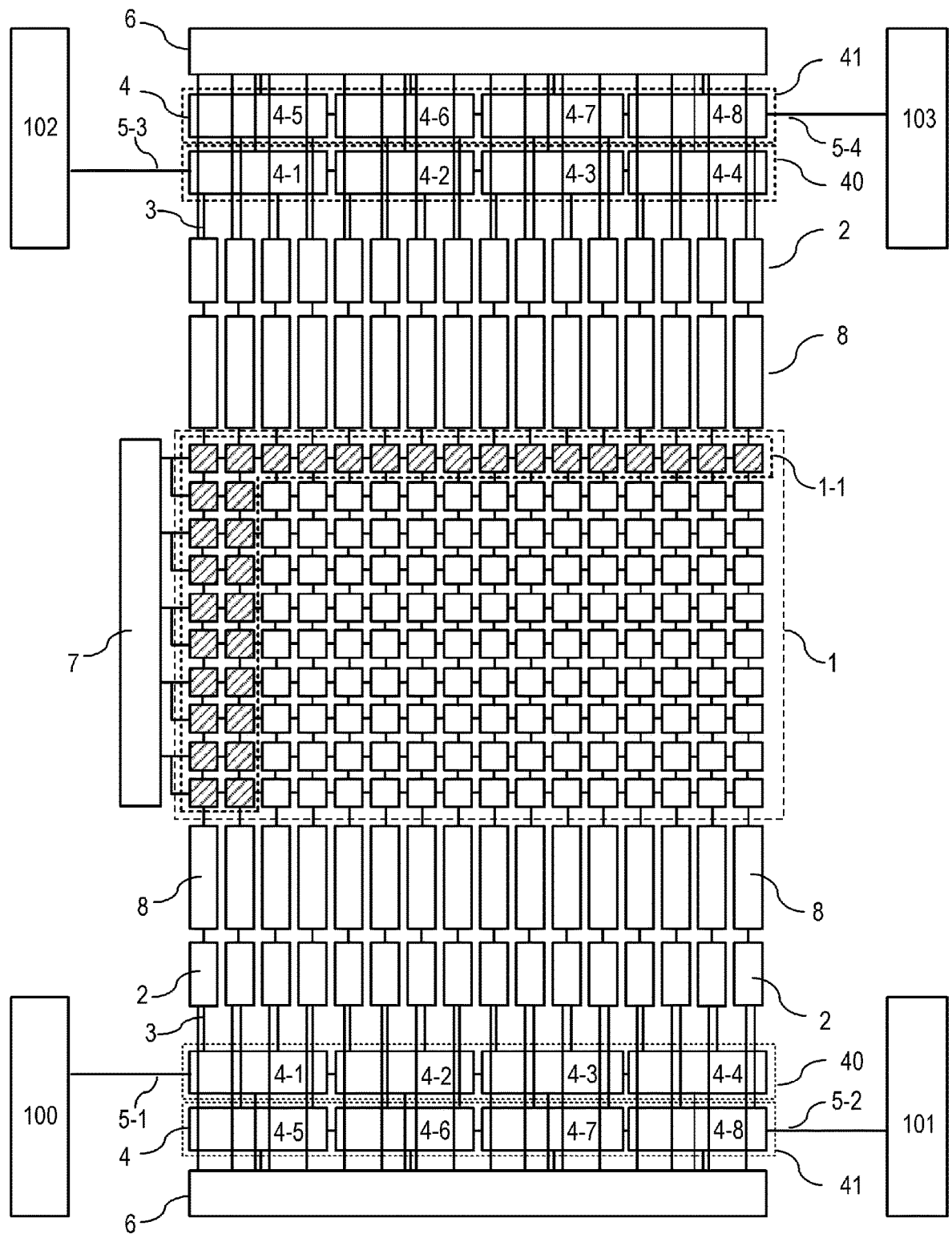
FIG. 11 is a circuit diagram of a photoelectric conversion device according to another example of Embodiment 1.

A pair of the signal transfer unit group 40 and the signal transfer unit group 41 is present in the present embodiment. However, even when another pair of the signal transfer unit group 40 and the signal transfer unit group 41 is further provided in an upper portion of the pixel unit 1 as shown in FIG. 11, the current consumption is smoothed and it is possible to reduce the power supply noise. In this case, it is possible to allow high-speed reading by selecting two rows at the same time with the vertical scan circuit 7, and reading the pixel signal of the pixel in an even-numbered row upward and reading the pixel signal of the pixel in an odd-numbered row downward. Note that FIG. 11 shows an example in which the signals of the pixels in two rows are read at the same time by two pairs of the signal transfer unit groups 40 and 41, but signals of the pixels in three or more rows may also be read at the same time in case where it is desired to increase the speed of the reading.

In addition, as shown in FIG. 11, a plurality of common output lines 5-1, 5-2, 5-3, and 5-4 may also be connected to signal processing circuits 100, 101, 102, and 103 which are different from each other.

Further, in case where a color filter of one color is provided for each pixel, a configuration may be adopted in which a digital signal of each color is transferred to each of the signal processing circuits 100, 101, 102, and 103 which are different from each other. That is, the color filter of one color is provided for each pixel, and a configuration may be adopted in which digital signals of pixels having color filters of different colors are transferred to, among a plurality of common output lines, different common output lines.

Figure 12:
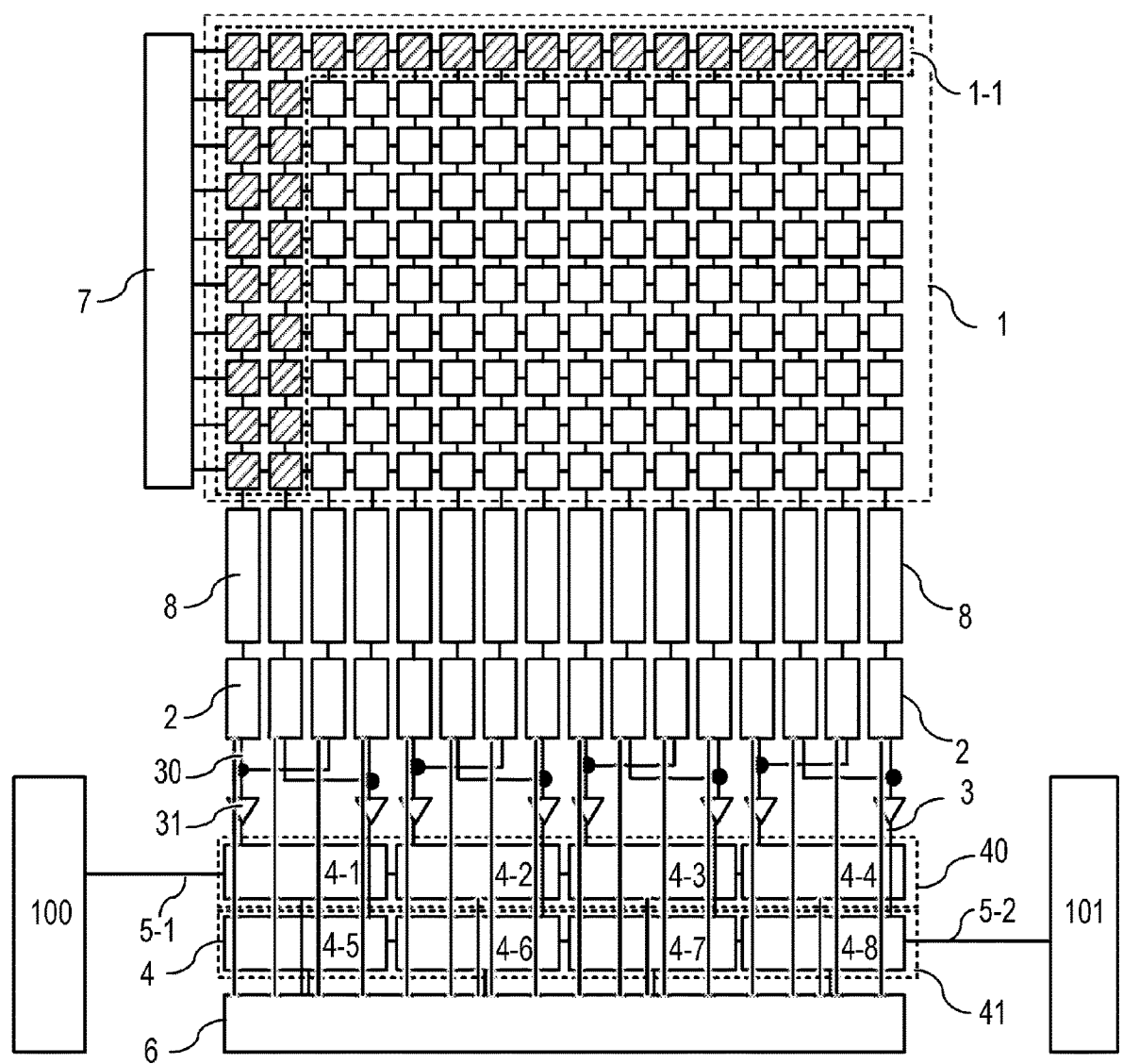
FIG. 12 is a circuit diagram of a photoelectric conversion device according to Embodiment 2.

<Embodiment 2>: FIG. 12 is a configuration diagram of a photoelectric conversion device according to Embodiment 2. In FIG. 12, the same components as those in FIG. 1 are designated by the same reference numerals, and the description of the components will be omitted. The photoelectric conversion device according to the present embodiment has a block output line 30 and a buffer circuit 31 in addition to the individual components of the photoelectric conversion device according to Embodiment 1.

The block output line 30 is an output line which integrates the holding circuits 2 corresponding to two columns into one block. In an example in FIG. 12, the holding circuit 2 in the first column and the holding circuit 2 in the third column are integrated into one block, and the holding circuit 2 in the second column and the holding circuit 2 in the fourth column are integrated into one block. Thus, by integrating the holding circuits 2 in sixteen columns into eight blocks, it is possible to form a read circuit for sixteen columns.

The buffer circuit 31 performs buffering on a digital signal (records a digital signal in a buffer) read from the holding circuit 2 into the block output line 30. The buffer circuit 31 is provided between the block output line 30 and the common output line 5-1 or 5-2.

Herein, also in the present embodiment, similarly to Embodiment 1, the photoelectric conversion device has the signal transfer unit group 40 in which the number of signal transfer units 4 of which the current consumption is suppressed decreases, and the signal transfer unit group 41 in which the number of signal transfer units 4 of which the current consumption is suppressed increases. Consequently, the current consumption in the horizontal transfer operation is smoothed, and it is possible to reduce the power supply noise.

Note that, in the present embodiment, the number of columns in the pixel unit 1 is sixteen and eight block output lines 30 are provided, and hence two holding circuits 2 are connected in parallel to each block output line 30. In contrast to this, in case where block division is not performed as in Embodiment 1, sixteen holding circuits 2 are connected in parallel, and the number of holding circuits 2 connected in parallel is twice the number thereof in the present embodiment and the digital output line is twice as long as that in the present embodiment. In contrast to this, in the present embodiment, by dividing the digital output line, the wiring resistance and wiring capacitance of the block output line 30, and the total capacitance of the holding circuits 2 to be connected are reduced. It goes without saying that the capacitance and resistance of read wiring are serious hindrances to high-speed reading. That is, according to Embodiment 2, it is possible to perform reading at higher speed while smoothing the current consumption and reducing the power supply noise.

Figure 13:
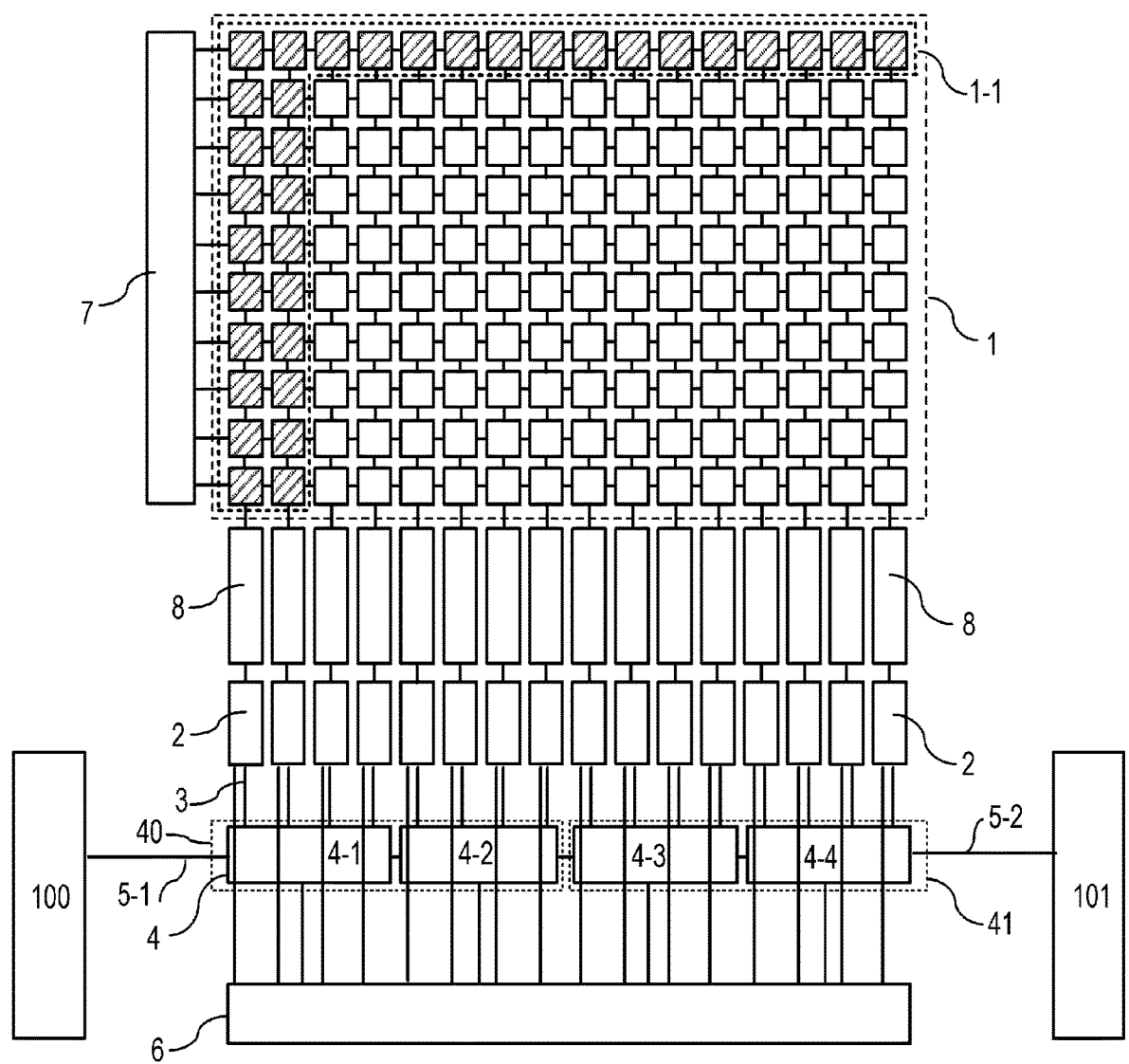
FIG. 13 is a circuit diagram of a photoelectric conversion device according to Embodiment 3.

<Embodiment 3>: FIG. 13 is a configuration diagram of a photoelectric conversion device according to Embodiment 3. In FIG. 13, the same components as those in FIG. 1 are designated by the same reference numerals, and the description of the components will be omitted.

In the present embodiment, four signal transfer units 4 are provided in the photoelectric conversion device. Two signal transfer units 4-1 and 4-2 form the signal transfer unit group 40, and are connected to the common output line 5-1. Tour signal transfer units 4-3 and 4-4 form the signal transfer unit group 41, and are connected to the common output line 5-2. In the present embodiment, the signal transfer unit group 40 and the signal transfer unit group 41 are connected in series.

Figure 14:
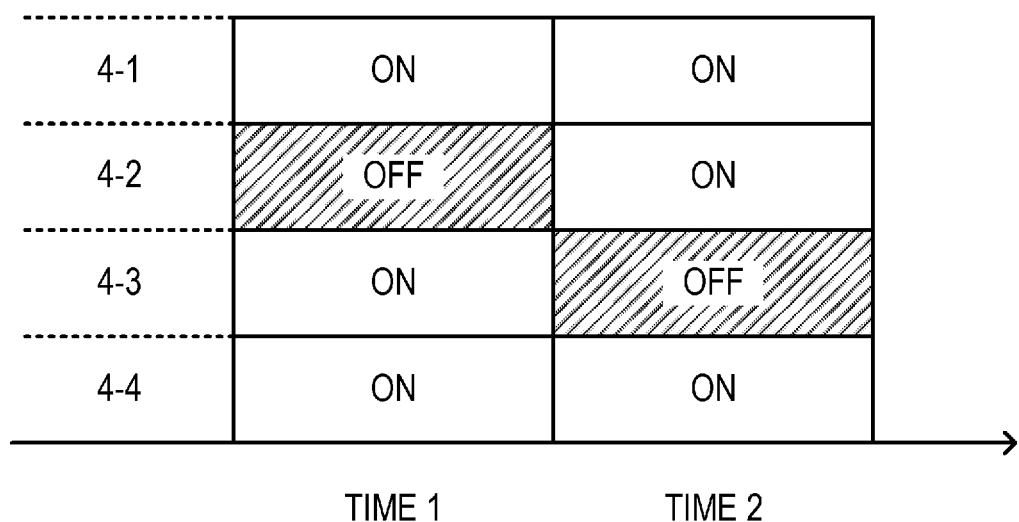
FIG. 14 is a view showing ON/OFF of a signal transfer unit according to Embodiment 3.

FIG. 14 is a view showing a suppression state of current of the four signal transfer units 4. The signal transfer unit 4 which transfers the digital signal is indicated by ON, and the signal transfer unit 4 which does not transfer the digital signal and of which the current consumption is suppressed is indicated by OFF.

At time 1, the signal transfer unit 4-1 of the signal transfer unit group 40 and the signal transfer units 4-3 and 4-4 of the signal transfer unit group 41 are in the ON state. On the other hand, the signal transfer unit 4-2 of the signal transfer unit group 40 is in the OFF state.

At time 2, the signal transfer units 4-1 and 4-2 of the signal transfer unit group 40 and the signal transfer unit 4-4 of the signal transfer unit group 41 are in the ON state. On the other hand, the signal transfer unit 4-3 of the signal transfer unit group 41 is in the OFF state.

Thus, the photoelectric conversion device according to the present embodiment also has the signal transfer unit group 40 in which the number of signal transfer units of which the current consumption is suppressed decreases, and the signal transfer unit group 41 in which the number of signal transfer units of which the current consumption is suppressed increases. Accordingly, the number of signal transfer units in the ON state and the number of signal transfer units in the OFF state at each time are "ON: three, OFF: one", and the number of the signal transfer units in the ON state and the number of signal transfer units in the OFF state are not changed and are constant irrespective of change of the time.

Consequently, even when the signal transfer unit group 40 and the signal transfer unit group 41 are disposed in series, the current consumption is smoothed and it is possible to reduce the power supply noise.

Figure 15:
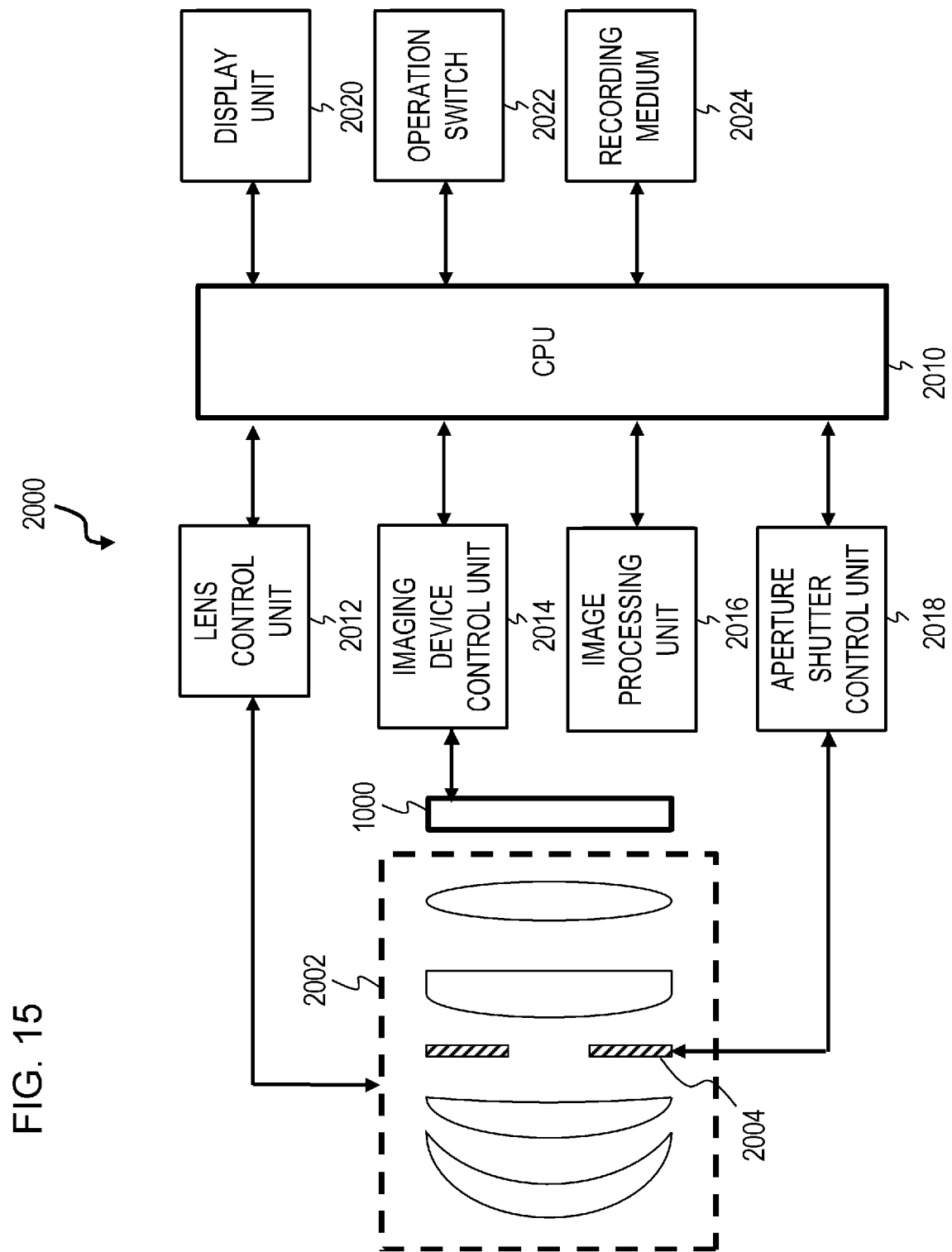
FIG. 15 is a configuration diagram of an imaging system according to Embodiment 4.

<Embodiment 4>: An imaging system according to Embodiment 4 will be described by using FIG. 15. FIG. 15 is a block diagram showing the schematic configuration of the imaging system according to the present embodiment.

The photoelectric conversion devices (imaging devices) described in Embodiments 1 to 3 described above can be applied to various imaging systems. The imaging system to which the photoelectric conversion devices can be applied is not particularly limited, and examples of the imaging system include various pieces of equipment such as a digital still camera, a digital camcorder, a surveillance camera, a copier, a fax, a cellular phone, a vehicle-mounted camera, an observation satellite, and a camera for medical use. In addition, the imaging system also includes a camera module including an optical system such as a lens and an imaging device (photoelectric conversion device). FIG. 15 is a block diagram of a digital still camera serving as an example of the imaging system.

As shown in FIG. 15, an imaging system 2000 includes an imaging device 1000, an imaging optical system 2002, a CPU 2010, a lens control unit 2012, an imaging device control unit 2014, and an image processing unit 2016. In addition, the imaging system 2000 includes an aperture shutter control unit 2018, a display unit 2020, an operation switch 2022, and a recording medium 2024.

The imaging optical system 2002 is the optical system for forming an optical image of a subject, and includes a lens group, and a diaphragm 2004. The diaphragm 2004 includes a function as an exposure time adjustment shutter when a still image is captured in addition to the function of adjusting a light amount when photographing is performed by adjusting an aperture diameter. The lens group and the diaphragm 2004 are held so as to be able to advance and retract along an optical axis direction, and their coordinated operations implement a scaling function (zoom function) and a focusing function. The imaging optical system 2002 may be integrated with the imaging system or may also be an imaging lens which can be mounted to the imaging system.

The imaging device 1000 is disposed in image space of the imaging optical system 2002 such that an imaging surface is positioned in the image space thereof. The imaging device 1000 is the photoelectric conversion device described in any of Embodiments 1 to 3, and is configured to include a CMOS sensor (pixel unit) and its peripheral circuit (peripheral circuit area). In the imaging device 1000, a two-dimensional single-plate color sensor is constituted by two-dimensionally disposing pixels having a plurality of photoelectric conversion units and disposing color filters in the pixels. The imaging device 1000 photoelectrically converts a subject image formed by the imaging optical system 2002, and outputs the subject image as an image signal or a focus detection signal.

The lens control unit 2012 is used for performing a scaling operation and focusing by controlling advancement-retraction drive of the lens group of the imaging optical system 2002, and is constituted by circuits and processing devices which are configured so as to implement its function. The aperture shutter control unit 2018 is used for adjusting the light amount for photographing by changing the aperture diameter (varying an aperture value) of the diaphragm 2004, and is constituted by circuits and processing devices which are configured so as to implement its function.

The CPU 2010 is a control device in a camera which is in charge of various control operations of a camera main body, and includes an arithmetic section, a ROM, a RAM, an A/D converter, a D/A converter, and a communication interface circuit. The CPU 2010 controls operations of individual units in the camera according to a computer program stored in the ROM or the like to execute a series of photographing operations such as AF, imaging, image processing, and recording which includes detection of the focus state (focus detection) of the imaging optical system 2002. CPU 2010 also functions as a signal processing unit.

The imaging device control unit 2014 is used for controlling the operation of the imaging device 1000, and performing A/D conversion on a signal output from the imaging device 1000 and transmitting the signal to the CPU 2010, and is constituted by circuits and control devices which are configured so as to implement its function. The imaging device 1000 may include the A/D conversion function. The image processing unit 2016 is a processing device for performing image processing such as γ conversion and color interpolation on the signal subjected to the A/D conversion to generate an image signal, and is constituted by circuits and control devices which are configured so as to implement its function. The display unit 2020 is a display device such as a liquid crystal display device (LCD), and displays information on photographing modes of the camera, a preview image before photographing, an image for checking after photographing, and an in-focus state at the time of focus detection. The operation switch 2022 is constituted by a power switch, a release (photographing trigger) switch, a zoom operation switch, and a photographing mode selection switch. The recording medium 2024 is used for recording a captured image or the like, and may be incorporated in the imaging system or may also be detachable such as a memory card.

By configuring the imaging system 2000 to which the photoelectric conversion device according to any of Embodiments 1 to 3 is applied in this manner, it is possible to implement the imaging system having high performance.

Figure 16A:
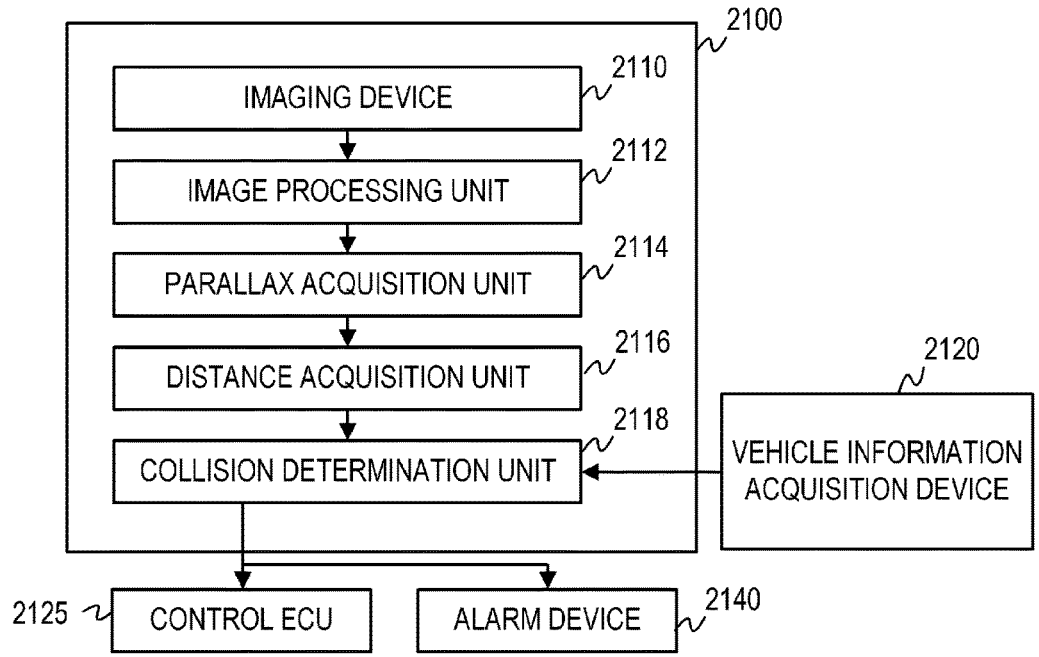
FIG. 16A is a configuration diagram of an imaging system according to Embodiment 5.
Figure 16B:
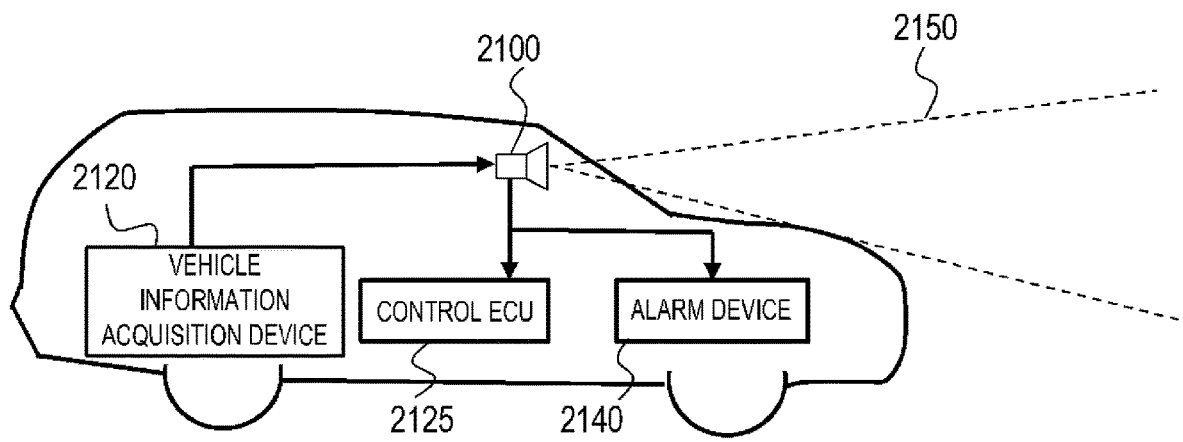
FIG. 16B is a configuration diagram of a movable body according to Embodiment 5.

<Embodiment 5>: An imaging system and a movable body according to Embodiment 5 will be described by using FIGS. 16A and 16B. FIGS. 16A and 16B are views showing the configurations of the imaging system and the movable body according to the present embodiment.

FIG. 16A shows an example of an imaging system 2100 related to a vehicle-mounted camera. The imaging system 2100 has an imaging device 2110. The imaging device 2110 is the photoelectric conversion device described in any of Embodiments 1 to 3 described above. The imaging system 2100 has an image processing unit 2112 which is a processing device for performing image processing on a plurality of pieces of image data acquired by the imaging device 2110. The imaging system 2100 has a parallax acquisition unit 2114 which is a processing device for calculating a parallax (a phase difference of parallax images) from the plurality of pieces of image data acquired by the imaging device 2110. In addition, the imaging system 2100 has a distance acquisition unit 2116 which is a processing device for calculating a distance to an object based on the calculated parallax. The imaging system 2100 has a collision determination unit 2118 which is a processing device for determining whether or not there is a possibility of a collision based on the calculated distance. Herein, each of the parallax acquisition unit 2114 and the distance acquisition unit 2116 is an example of information acquisition means for acquiring information such as distance information to the object. That is, the distance information is information on the parallax, a defocus amount, and the distance to the object. The collision determination unit 2118 may determine the possibility of the collision by using any of the pieces of the distance information. Each processing device described above may be implemented by hardware designed specifically for the processing device, or may also be implemented by general-purpose hardware which performs computing based on a software module. In addition, the processing device may also be implemented by a field programmable gate array (FPGA), an application specific integrated circuit (ASIC), or the like. Further, the processing device may also be implemented by a combination thereof.

The imaging system 2100 is connected to a vehicle information acquisition device 2120, and is able to acquire vehicle information such as a vehicle speed, a yaw rate, and a rudder angle. A control ECU 2125 which is a control device for outputting a control signal which generates braking force for a vehicle based on the determination result in the collision determination unit 2118 is connected to the imaging system 2100. That is, the control ECU 2125 is an example of movable body control means for controlling a movable body based on the distance information. In addition, the imaging system 2100 is connected also to an alarm device 2140 for giving an alarm to a driver based on the determination result in the collision determination section 2118. For example, in case where the collision possibility is high as a result of the determination in the collision determination unit 2118, the control ECU 2125 performs vehicle control for avoiding a collision or reducing damage by applying a brake, releasing the accelerator, or reducing engine output. The alarm device 2140 gives an alarm to the user by sounding an alarm such as sound, displaying alarm information on a screen of a car navigation system or the like, or vibrating a seatbelt or a steering wheel.

In the present embodiment, an image of a surrounding area of a vehicle, e.g., the front or the rear of the vehicle is captured by the imaging system 2100. FIG. 16B shows the imaging system 2100 in case where the image of the front of the vehicle (imaging range 2150) is captured. The vehicle information acquisition device 2120 sends an instruction such that the imaging system 2100 is caused to operate and execute imaging. By using the photoelectric conversion device according to any of Embodiments 1 to 3 described above as the imaging device 2110, the imaging system 2100 of the present embodiment can improve accuracy in distance measurement.

In the above description, an example in which control is performed such that the vehicle does not collide with another vehicle is described, but the imaging system can also be applied to control in which a vehicle drives itself so as to follow another vehicle, or control in which a vehicle drives itself so as not to deviate from a lane. Further, the application of the imaging system is not limited to a vehicle such as a car, and the imaging system can be applied to a movable body (transport equipment) such as, e.g., a ship, an aircraft, or an industrial robot. A moving device in the movable body (transport equipment) includes various drive sources such as an engine, a motor, a wheel, and a propeller. In addition, the application of the imaging system is not limited to the movable body, and the imaging system can be widely applied to equipment which uses object recognition such as intelligent transport systems (ITS).

According to the present technique, it is possible to reduce the power supply noise in the photoelectric conversion device.

<Other Embodiments>: Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-055714, filed on Mar. 26, 2020, which is hereby incorporated by reference herein in its entirety.

What is claimed is:

1. A photoelectric conversion device comprising:
a plurality of pixels which are disposed in a plurality of columns;
a plurality of holding circuits which are disposed so as to correspond to the columns in which the plurality of pixels are disposed and hold digital signals corresponding to outputs of the pixels;
a first signal transfer unit group having a plurality of signal transfer units which transfer digital signals from a first holding circuit group which is part of the plurality of holding circuits and has two or more of the holding circuits;
a second signal transfer unit group having a plurality of signal transfer units which transfer digital signals from a second holding circuit group which is another part of the plurality of holding circuits and has two or more of the holding circuits; and
a plurality of common output lines which include a first common output line to which digital signals are transferred from the first signal transfer unit group and a second common output line to which digital signals are transferred from the second signal transfer unit group, wherein
each of the plurality of signal transfer units is capable of transiting to a first state and a second state in which current consumption is less than current consumption in the first state, and,
in a predetermined period, a number of the signal transfer units in the second state increases in the first signal transfer unit group and a number of the signal transfer units in the second state decreases in the second signal transfer unit group.

2. The photoelectric conversion device according to claim 1, wherein the first signal transfer unit group and the second signal transfer unit group transfer digital signals in mutually opposite directions.

3. The photoelectric conversion device according to claim 1, wherein, in the predetermined period, a number of the signal transfer units in the first state and a number of the signal transfer units in the second state in all of the signal transfer units included in the first signal transfer unit group and the second signal transfer unit group are constant.

4. The photoelectric conversion device according to claim 1, further comprising:
a plurality of block output lines each of which is provided so as to correspond to a block including two or more of the holding circuits, and to which digital signals held in two or more of the holding circuits included in each of the blocks are output, wherein
two or more of the block output lines which are part of the plurality of block output lines are connected to the first signal transfer unit group, and
two or more of the block output lines which are another part of the plurality of block output lines are connected to the second signal transfer unit group.

5. The photoelectric conversion device according to claim 4, further comprising:
a buffer circuit which is provided between the corresponding block output line and one of the plurality of common output lines and performs buffering on a digital signal from the block output line.

6. The photoelectric conversion device according to claim 1, further comprising:
a horizontal scan circuit which controls an output of each of the plurality of holding circuits, wherein
the horizontal scan circuit 1) controls outputs of the first holding circuit group such that digital signals are transferred to the first common output line in an order in which the columns of the holding circuits in the first holding circuit group are arranged, and 2) controls outputs of the second holding circuit group such that digital signals are transferred to the second common output line in an order in which the columns of the holding circuits in the second holding circuit group are arranged.

7. The photoelectric conversion device according to claim 1, wherein, in the second state, input of a reference clock to the signal transfer unit is stopped.

8. The photoelectric conversion device according to claim 1, wherein, in the second state, a reset signal is input to the signal transfer unit.

9. The photoelectric conversion device according to claim 1, wherein, in the second state, an input of the signal transfer unit is fixed to a reference potential.

10. The photoelectric conversion device according to claim 1, wherein the signal transfer unit is a synchronization delay circuit which synchronizes a digital signal input from the holding circuit to a clock.

11. The photoelectric conversion device according to claim 1, wherein
each of the plurality of holding circuits outputs a differential signal including a normal signal and an inverted signal to the signal transfer unit as a digital signal, and the signal transfer unit determines a digital signal to be transferred by comparing the normal signal with the inverted signal.

12. The photoelectric conversion device according to claim 1, wherein
each of the plurality of holding circuits holds a reference signal which is a digital signal of a pixel in a reset state and an effective signal which is a digital signal of a pixel in a non-reset state, and
the reference signal and the effective signal held by one holding circuit are transferred to, among the plurality of common output lines, a same common output line.

13. The photoelectric conversion device according to claim 1, wherein
a color filter of one color is provided in each of the plurality of pixels, and
digital signals of the pixels in which the color filters of different colors are provided are respectively transferred to, among the plurality of common output lines, the common output lines which are different from each other.

14. The photoelectric conversion device according to claim 1, wherein digital signals held in the holding circuit in an odd-numbered column and digital signals held in the holding circuit in an even-numbered column are transferred to, among the plurality of common output lines, the common output lines which are different from each other.

15. The photoelectric conversion device according to claim 1, further comprising:
a third signal transfer unit group and a fourth signal transfer unit group which are different from the first signal transfer unit group and the second signal transfer unit group, wherein
each of the third signal transfer unit group and the fourth signal transfer unit group has a plurality of the signal transfer units which are different from each other, and, in a predetermined period, a number of the signal transfer units in the first state increases in the third signal transfer unit group and a number of the signal transfer units in the first state decreases in the fourth signal transfer unit group.

16. The photoelectric conversion device according to claim 1, further comprising:
a plurality of signal processing circuits which perform processing on digital signals, wherein
the plurality of common output lines are connected to the signal processing circuits which are different from each other.

17. An imaging system comprising:
the photoelectric conversion device according to claim 1; and
a processing device which processes a signal output from the photoelectric conversion device.

18. A movable body comprising:
the photoelectric conversion device according to claim 1;
a moving device;
a processing device which acquires information from a signal output from the photoelectric conversion device; and
a control device which controls the moving device based on the information.

* * * * *